US008972888B2

(12) United States Patent
Sawyer

(10) Patent No.: US 8,972,888 B2
(45) Date of Patent: Mar. 3, 2015

(54) GRAPHICAL USER INTERFACE FOR FILTERING A POPULATION OF ITEMS

(75) Inventor: Brian N. Sawyer, Santa Monica, CA (US)

(73) Assignee: eBay Inc., San Jose, CA (US)

( * ) Notice: Subject to any disclaimer, the term of this patent is extended or adjusted under 35 U.S.C. 154(b) by 880 days.

(21) Appl. No.: 12/781,630

(22) Filed: May 17, 2010

(65) Prior Publication Data

US 2010/0229119 A1    Sep. 9, 2010

Related U.S. Application Data

(63) Continuation of application No. 11/382,733, filed on May 11, 2006, now Pat. No. 7,721,230, which is a continuation of application No. 09/821,504, filed on Mar. 28, 2001, now Pat. No. 7,080,328.

(51) Int. Cl.
*G06F 3/048* (2013.01)
*G06F 17/30* (2006.01)
*G06F 17/22* (2006.01)
*G06Q 40/06* (2012.01)

(52) U.S. Cl.
CPC ...... *G06F 17/30864* (2013.01); *G06F 17/2247* (2013.01); *G06Q 40/06* (2013.01); *Y10S 707/99935* (2013.01); *Y10S 707/99934* (2013.01); *Y10S 715/968* (2013.01)
USPC .......... 715/800; 707/754; 707/771; 707/777; 707/778; 707/999.005; 707/999.004; 715/968

(58) Field of Classification Search
CPC .......................... G06F 17/2247; G06F 3/0481
USPC ................... 715/800; 707/754, 771, 777, 778
See application file for complete search history.

(56) References Cited

U.S. PATENT DOCUMENTS

| 5,544,360 | A | 8/1996 | Lewak et al. |
| 5,668,966 | A | 9/1997 | Ono et al. |
| 5,778,357 | A | 7/1998 | Kolton et al. |
| 5,894,311 | A | 4/1999 | Jackson |
| 5,926,809 | A | 7/1999 | Szalwinski |
| 6,081,814 | A | 6/2000 | Mangat et al. |
| 6,085,187 | A | 7/2000 | Carter et al. |

(Continued)

OTHER PUBLICATIONS

Rosenberg, J. M., *Dictionary of Computers information Processing and Telecommunications*, Second Edition, John Wiley & Sons, (Aug. 1990).

(Continued)

*Primary Examiner* — Tadeese Hailu
(74) *Attorney, Agent, or Firm* — Schwegman Lundberg & Woessner, P.A.

(57) ABSTRACT

Graphical user interface for filtering a population of items. The graphical user interface may be implemented as a method on a system comprising a computer server or other computing device. The system defines a library of available criteria to be used in filtering a population of items to identify items of interest. Each criterion has a graphical representation. The system receives an indication of at least one of the criterion to be applied to the population as a filter and also accepts an indication of a tier of the filter to which the selected criterion is to be associated. The system identifies a list of items of interest satisfying a current set of criteria defining the filter. A graphical representation of the filter is displayed by the system while it is being constructed by the user. In one embodiment, the items are securities such as stocks.

32 Claims, 3 Drawing Sheets

(56) References Cited

U.S. PATENT DOCUMENTS

| | | |
|---|---|---|
| 6,208,985 B1 | 3/2001 | Krehel |
| 6,223,145 B1 | 4/2001 | Hearst |
| 6,300,949 B1 | 10/2001 | Shudo et al. |
| 6,308,175 B1 | 10/2001 | Lang et al. |
| 6,334,131 B2 | 12/2001 | Chakrabarti et al. |
| 6,418,429 B1 | 7/2002 | Borovoy et al. |
| 6,434,545 B1 | 8/2002 | MacLeod et al. |
| 6,460,031 B1 | 10/2002 | Wilson et al. |
| 6,467,052 B1 | 10/2002 | Kaler et al. |
| 6,560,590 B1 | 5/2003 | Shwe et al. |
| 6,567,812 B1 | 5/2003 | Garrecht et al. |
| 6,594,670 B1 | 7/2003 | Genser |
| 6,598,042 B1 | 7/2003 | Kienan |
| 6,647,383 B1 | 11/2003 | August et al. |
| 6,748,377 B1 | 6/2004 | Attaluri |
| 6,785,668 B1 | 8/2004 | Polo et al. |
| 6,907,424 B1 | 6/2005 | Neal et al. |
| 6,915,308 B1 | 7/2005 | Evans et al. |
| 6,925,608 B1 | 8/2005 | Neale et al. |
| 6,931,389 B1 | 8/2005 | Bleizeffer et al. |
| 7,080,328 B1 | 7/2006 | Sawyer |
| 7,107,536 B1 | 9/2006 | Dowling |
| 7,188,100 B2 | 3/2007 | De Bellis et al. |
| 7,464,092 B2 | 12/2008 | Lee et al. |
| 7,721,230 B2 | 5/2010 | Sawyer |
| 2002/0149614 A1 | 10/2002 | Biebesheimer et al. |
| 2002/0152222 A1 | 10/2002 | Holbrook |
| 2006/0036588 A1 | 2/2006 | Frank et al. |
| 2006/0195799 A1 | 8/2006 | Sawyer |
| 2007/0156677 A1 | 7/2007 | Szabo |

OTHER PUBLICATIONS

U.S. Appl. No. 11/382,733, Final Office Action mailed Aug. 13, 2009, 18 Pgs.
U.S. Appl. No. 11/382,733, Non Final Office Action mailed Feb. 11, 2009, 21 pgs.
U.S. Appl. No. 11/382,733, Notice of Allowance mailed Jan. 6, 2010, 7 pgs.
U.S. Appl. No. 11/382,733, Response filed Jun. 9, 2009 to Non Final Office Action mailed Feb. 11, 2009, 17 pgs.
U.S. Appl. No. 11/382,733, Response filed Nov. 13, 2009 to Final Office Action mailed Aug. 13, 2009, 17 pgs.

GRAPHICAL USER INTERFACE FOR FILTERING A POPULATION OF ITEMS

CROSS-REFERENCE TO RELATED APPLICATIONS

This application is a continuation of U.S. patent application Ser. No. 11/382,733 filed May 11, 2006, now U.S. Pat. No. 7,721,230 which was a continuation of U.S. patent application Ser. No. 09/821,504 filed Mar. 28, 2001, now U.S. Pat. No. 7,080,328 both of which are incorporated herein by reference.

FIELD OF THE INVENTION

The invention relates to graphical user interfaces. More specifically, the invention relates to a graphical user interface for filtering a population of items.

BACKGROUND OF THE INVENTION

When presented with a large population of items such as hundreds, thousands, or more items, there are many ways to present these items and many ways to select a group of these items meeting a set of criteria.

Traditionally, when going to a restaurant, the population of available food items may be displayed in categories such as, for example, appetizers, salads, entrees, desserts, side dishes. Subcategories signifying the kind of flavor, style of dish, or the main ingredient are also common. Examples of the actual values (or "items") include beef, chicken, vegetarian, spicy, house specialties, etc. Because the size of this list is manageable, a restaurant patron typically has no problem mentally filtering through the population of menu choices to select those items to order for a meal.

Another example of a large population of items are the course offerings at a university. Courses are typically arranged in a school bulletin by department and then, within department, as introductory, upper level classes, and graduate classes. Other information such as lists of required courses for majors or concentrations are also provided. Although a little more complicated and extensive than a restaurant menu, a student can readily select those courses the student wishes to take by flipping through the categorized listings in a school bulletin.

Another example of a large population of items are those securities, stocks, mutual funds, and other investment products that may be available to an investor. Groups of securities include those listed on the New York Stock Exchange (NYSE), traded on the NASDAQ and the American Stock Exchange, and those comprising well known indices such as the Russell 2000, Standard & Poor's 500, etc. Stocks and mutual funds may be categorized by capitalization as large, middle, and small, as emerging growth, value, growth, high risk, low risk, or any combination of these and other categorizations. However, unlike using a restaurant menu or a school bulletin, it is more challenging to select from the population of securities or mutual funds those securities or mutual funds that meet a set of desired criteria, at least in part because there are many more possible values than present in a restaurant menu, and each value can be categorized by many more properties).

SUMMARY OF THE INVENTION

A graphical user interface for filtering a population of items is describe herein. The graphical user interface may be implemented as a method on a system comprising a computer server or other computing device. The system defines a library of possible criteria to be used in filtering a population of items to identify items of interest. Each criterion has a graphical representation. The system receives an indication of at least one of the criterion to be applied to the population as a filter and accepts an indication of a tier of the filter to which the selected criterion is to be associated. The system identifies a list of items of interest satisfying a current set of criteria defining the filter. A graphical representation of the filter is displayed by the system while it is being constructed by the user. In one embodiment, the items are securities such as stocks.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION OF THE INVENTION

Figure 1:
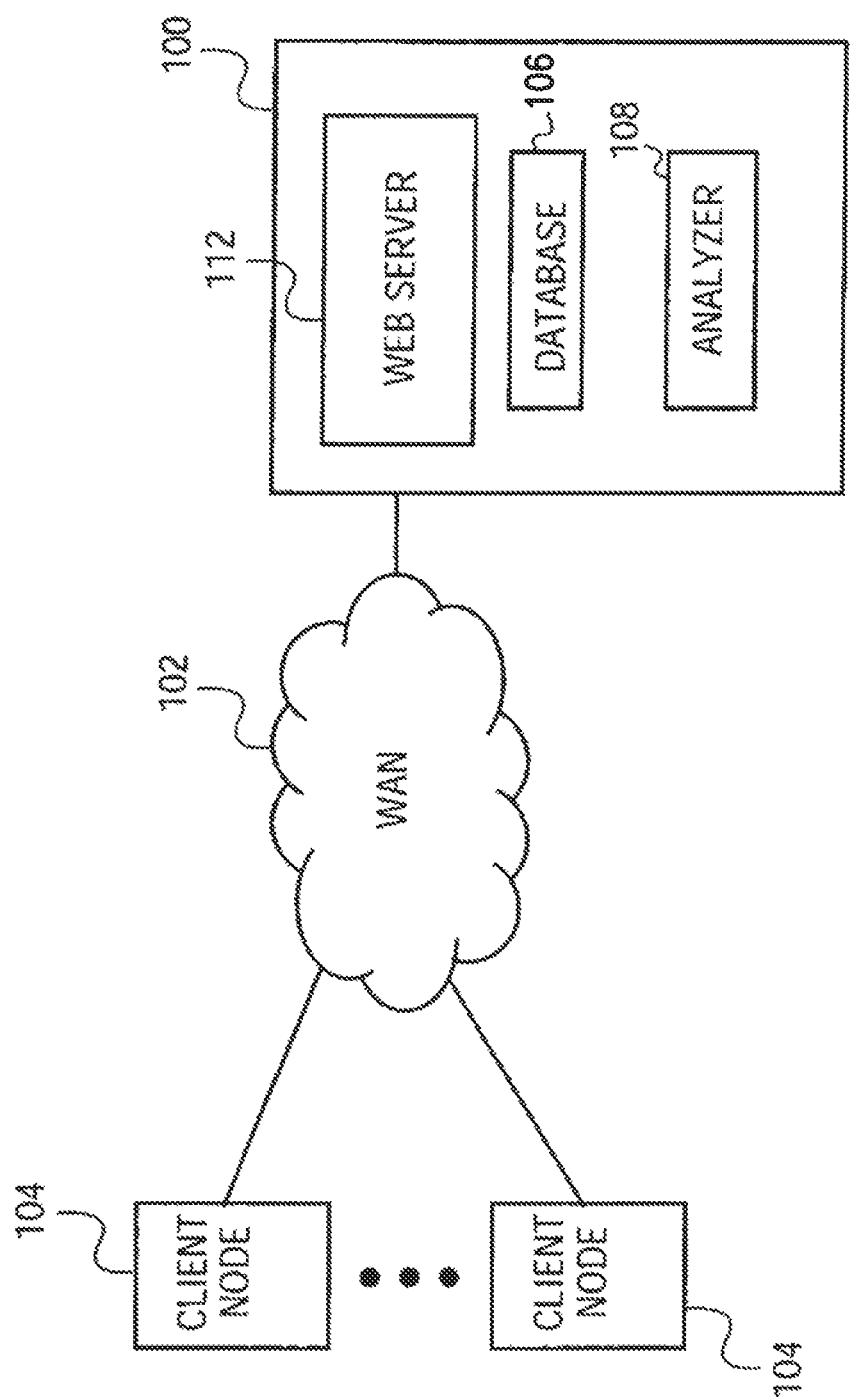
FIG. 1 is a block diagram of a system in which one embodiment of the invention may be implemented.

FIG. 1 is a block diagram of a system of in which one embodiment of the invention may be implemented. A server node 100 is coupled to a wide area network (WAN) 102 such as the Internet. The method described herein may be implemented as software on server node 100. Also coupled to WAN 102 are a plurality of client nodes 104. Client nodes 104 may be a personal computer (PC), a WAN enabled phone, a personal digital assistant (PDA), a computer tablet, a set top box, or any other computing device with which a user may connect to a WAN. Server node 100 may include database 106 and analyzer 108. The server node 100 includes web server software 112 to serve web pages, applets and information to, and to receive information from client nodes 104. The server node 100 also receives user input from client nodes 104 through WAN 102.

The server node 100 may be any server computer that includes a processor, memory, and a machine readable medium such as magnetic disk drives, optical disk drives, memory cards or sticks, flash memory devices, that may be accessed locally or remotely via any known means of communication such as WAN, local area network (LAN), via land line, or satellite. Although not shown, server node 100 may be implemented in other embodiments as a cluster, grouping, LAN, etc. of servers including one or more specialized servers such as application servers, graphics servers, database servers, and the like.

The server node may provide information to users at client nodes via a web page or sequence of web pages in hypertext mark up language (HTML) that prompt the user to select and provide information, and that also display useful information to the user. Any references to prompting or providing web pages herein are achieved in this manner and may include a plurality of user interface items and user interface techniques, including; but not limited to buttons, sliders, graphics, text entry fields, JAVA® applets, and the like. Alternatively, the server node may simply be a stand alone PC running a standard executable application.

Server node 100 may store information, including a plurality of securities information and equities information in database 106. Database 106 may be a relational database such as an Oracle-style database or may include one or more of such databases. To obtain information, server node 100 may communicate with third party databases (not shown) via WAN 102 or via a direct connection.

In another embodiment, the method disclosed herein may be implemented as software on a personal computer (PC), a cellular telephone phone, a personal digital assistant (PDA), a computer tablet, a set top box, or any other computing device having a processor, memory, and machine readable medium that is, in one embodiment, capable of connecting to and communicating over a WAN.

Figure 2:
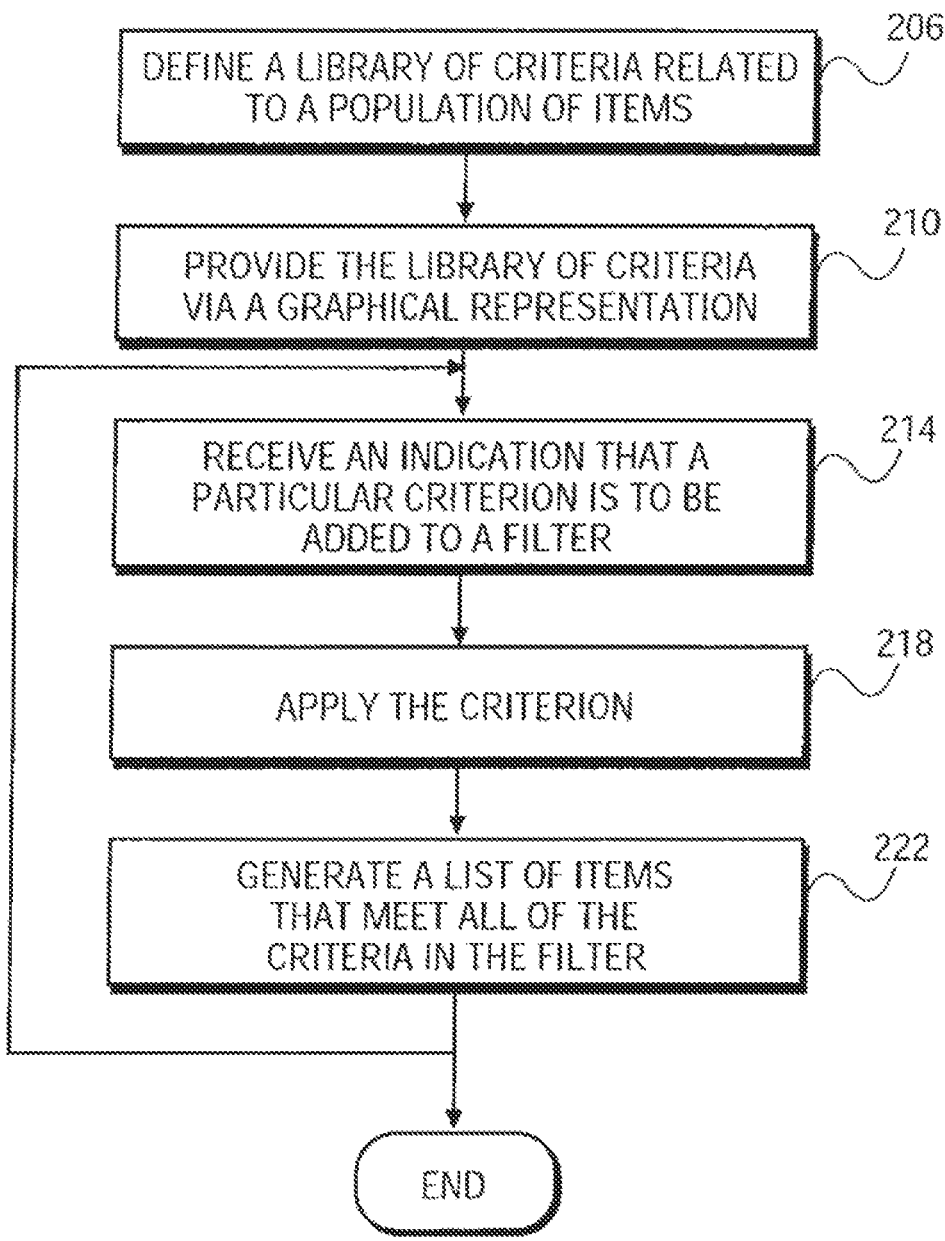
FIG. 2 is a flow diagram of operation of one embodiment of the invention.
Figure 3:
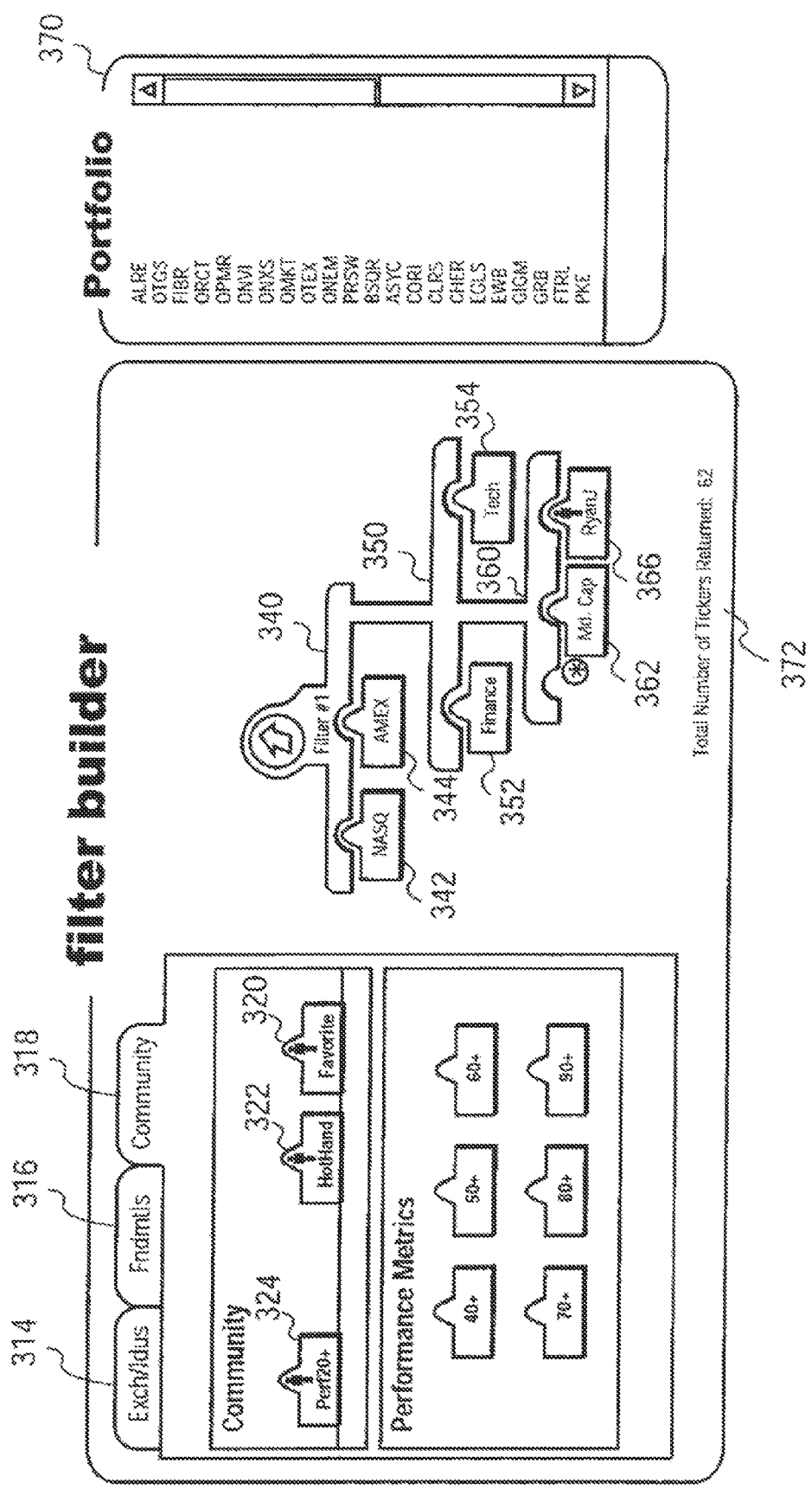
FIG. 3 is a screen image resulting from application of one embodiment of the invention.

FIG. 2 is a flow diagram of operation of one embodiment of the invention. FIG. 3 is a screen image resulting from execution of one embodiment of the invention. FIG. 3 will be referred to in describing the method set forth in FIG. 2. The method described herein involves providing a graphical user interface for filtering a population of items. The method may be implemented as software on server computer such as server node 100 described above regarding FIG. 1. The software running on a server shall be referred to herein as a system. In other embodiments, the method may be implemented in hardware or a in combination of hardware and software.

According to one embodiment of the method, the system defines a library of available criteria relating to a population of items, as shown in block 206. In one embodiment, the items may be securities or stocks. In this embodiment, the criteria may include, for example, membership in well known indices or exchanges, such as the New York Stock Exchange (NYSE), Standard & Poor's 500, NASDAQ, the Russell 2000, etc.; categorization by capitalization such as large, middle, and small, by value, by growth; dividend information such as yield or per share; pertinent sector such as technology, energy, transportation, financial, retail, etc.; well-known metrics such as beta, price to earnings ratio, debt to equity ratio, percentage or actual change in share price over a particular period of time, such as 30 day return, quarterly return, year to date return, three year return, five year return, 10 year return, etc. These criteria may be preset and defined by the system and/or may be user definable. In one embodiment, the criteria also include selections of favorite or otherwise preferred securities selected by other members of an on-line community. In one embodiment, the population of items, including descriptive information about the items, and the applicable criteria may be stored in a database, such as database 114 shown in FIG. 1. The descriptive information about the items allows for the application of the criteria as a filter and, when the items are securities, may include current share price, share prices at various dates, price to earnings ratio, categorization information, sector information, etc. In another embodiment, some or all of the population of items, including descriptive information about the items, and/or the applicable criteria may be stored remotely on other servers such as database server and application servers. These remote servers, not shown, may be implemented as part of the system described herein, or may be maintained by third parties. In yet another embodiment in which the system is a personal computer, some or all of the population of items, including descriptive information about the items, and/or the applicable criteria may be stored locally on a hard drive or other storage device.

In a related embodiment, the items may be mutual funds and the criteria may include categorization such as capitalization (small, middle, and large), value, income, growth, blend; a risk categorization; load information such as back end, front end, and none; expense ratio; minimum investment; various metrics such as a alpha, beta, R-squared, percentage change in share price over a particular period of time such as 30 day return, quarterly return, year to date return, three year return, five year return, 10 year return, etc; sectors such as technology, energy, finance, retail, etc.; third party rating, such as, for example, that provided by Morningstar, Inc. of Chicago, Ill.; and others.

The system then provides the library of criteria via a graphical representation to the user, as shown in block 210. In one embodiment, the criteria may each be represented as a single peg puzzle piece such as criteria NASDAQ AMEX 344, technology 354, finance 352, etc. as shown in FIG. 3. In one embodiment, the criteria may be provided graphically in sets or groups. For example, groupings such as exchange/index 314, fundamentals 316, and community 318 may be provided, as shown in FIG. 3. The exchange/index group may include the NASDAQ AMEX NYSE, S&P 500, Russell 2000, etc. This group may also include pertinent sectors such as technology 354, energy, finance 352, retail, etc. The fundamentals may include capitalization such as large, middle or md. cap 362, and small; and well-known metrics such as beta, price to earnings ratio, percentage increase in share price over a particular period of time, etc. Community may include those securities selected as favorites or otherwise preferred by other members of an on-line community, such as RyanJ 366. In one embodiment, the community could be further broken down into subgroups such as those other members of the community that are favorites of the particular user, such as favorites 320, those member of the community that meet a system definition as having hot hands, such as hot-hands 322, and those community members having certain characteristics, such as for example, greater than 20% annual portfolio return 324. In this embodiment, clicking on or otherwise activating favorites 320, hot-hands 322, greater than 20% annual portfolio return 324 creates a screen area or sub-window containing those community members meeting the particular criteria.

The system then receives an indication that a particular criterion is to be added to a filter, as shown in block 214. In one embodiment, a filter may have multiple levels or tiers, such as tier one 340, tier two 350 and tier three 360 of FIG. 3. The criteria added to each filer tier may be indicated by a user by a mouse click or other user input device and may then be added to the filter by dragging and dropping via the mouse or other input device or technique via well-known graphical user interface methods. In this embodiment, the single peg puzzle pieces may be placed over a horizontal bar such that a matching groove appears for the addition of the criterion to that tier by the user placing the pegged criterion into the groove at the particular tier. After a particular criterion has been added to a filter, the criterion is applied by the system, as shown in block 218. In one embodiment, this application of the filter is accomplished by software such as analyzer 108. The system then generates a list of items that meet al of the criteria in the filter, as shown in block 222. That is, in one embodiment, analyzer 108 applies all of the selected criteria to the population of items as a filter and generates a list of items that meet the criteria. In one embodiment, a running tally of the number of members of the population meeting the criteria defined by the filter is maintained and presented as both a list of items meeting the criteria and a raw total count of the number of items that meet the criteria. In one embodiment in which the items are securities, the list of items may be referred to as a portfolio as depicted as portfolio 370 and the raw total count by be referred to as total number of tickers 372.

The system may continue to receive criteria, apply the criteria and generate a list of items that meet the criteria of the filter by cycling through blocks 214, 218 and 222 until the user ceases adding additional criteria. As such, the list of items in the form of portfolio 370 and the raw total count in the form of total number of tickers 372 are continually updated. During such a cycle, a user of the system may apply criteria to any tier, or create an additional tier by pre-pending, inserting or appending the new tier. That the system provides a running portfolio also allows the user to view the effect of adding a particular criterion to the filter, where the criterion may be added to an existing tier or included in a new tier of the filter.

In one embodiment, the system may provide the user the capability to remove a filter criterion from any tier and view the resulting running portfolio. This removal may be temporary or may be permanent depending on the implementation or the user's input selection. In this way, a user may view the effect of the particular criterion on the results of the filter by comparing the portfolio both before and after removal of a criterion. For example, middle capitalization md. cap 362 of FIG. 3 may be removed so that the portfolio resulting from the removal may be viewed. In a related embodiment, a criterion may be removed and replaced with another criterion to compare the differing effects of the two criteria. For example, middle capitalization may be replaced with small capitalization such that md. cap 362 of FIG. 3 may be removed and replaced with sm. cap, not shown; or, for example, AMEX may be replaced with NYSE such that AMEX of FIG. 3 may be removed and replaced with NYSE, not shown.

In yet another related embodiment, the system may allow the user to move a criterion between filter tiers. In this way, a user may view the effect of the particular criterion on the results of the filter by comparing the running portfolio before and after moving the criterion. For example, middle capitalization may be moved from one tier to another to see how it affects the portfolio, and more specifically, md. cap 362 of FIG. 3 may be moved from tier three 360 to tier two 350.

In one embodiment, clicking on different tiers of the filter will result in a display of the list of items at that particular tier by applying all criteria at that and all prior tiers to the population of items.

In one embodiment, the analyzer of the system applies a Boolean OR to those criteria on a same tier of the graphical representation. In one embodiment, the analyzer of the system applies a Boolean AND to the different tiers of the filter. For example, the result of tier one 340 depicted in FIG. 3 are those securities listed on the NASDAQ and AMEX exchanges. When criteria limiting the results to those stocks in the finance sector 352 or the tech sector 354 are applied as indicated by the user in tier two 350, the result includes those technology and finance stocks from the AMEX and NASDAQ exchanges. Tier three 360 further filters the population of all securities to those that are mid cap 362 or are in a portfolio of RyanJ 366. The result listed in the running portfolio 370 includes those stocks traded on the NASDAQ or the AMEX which are in the finance or technology sectors, and which are mid cap or are in a portfolio of RyanJ. In this example, there are sixty-two securities that result from the application of the totality of this filter.

According to other embodiments, a user can benefit from using the graphical user interface method of applying filters based on criteria pertinent to a population of items when there is any large population of items from which a user desires to select a subset, such as when the population of items is school classes, a parts inventory, an accessories inventory, a grouping of recipes, a list of encyclopedia articles, magazine article, newspaper articles, and the like.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

The invention claimed is:

1. A system comprising one or more computer processors configured for:
   receiving a selection of at least one criterion of available criteria in a library of criteria to be applied to a population as a filter;
   accepting an indication of a first tier of the filter to which the selected criterion is to be associated;
   accepting an input to move the selection criterion from the first tier to be applied to a second tier of the filter;
   identifying a list of items of interest to apply the filter to, based on the available criteria;
   displaying a graphical representation of the filter, including a graphical representation of the selection criterion being associated with the first tier of the filter and a graphical representation of the selection criterion being moved from the first filter to be applied to the second tier of the filter.

2. The system of claim 1, comprising a computer processor configured for including the selected criterion into the first tier such that a graphical representation of the selected criterion is merged with a graphical representation of the first tier in the graphical representation of the filter.

3. The system of claim 1, comprising a computer processor configured for:
   applying a Boolean OR to those criteria on a same tier of the filter; and
   applying a Boolean AND to those criteria residing on different tiers of the filter.

4. The system of claim 1, comprising a computer processor configured for:
   displaying a representation of the list of items of interest.

5. The system of claim 1, comprising a computer processor configured for:
   receiving an indication of one of the tiers of the filter;
   identifying, in response to the receiving, a group of items satisfying the filter at the indicated tier; and
   displaying the group of items.

6. The system of claim 1, wherein available criteria comprise criteria derived from a community of investors.

7. The system of claim 1, wherein available criteria comprises user customizable filter criteria.

8. The system of claim 1, wherein the current set of criteria comprises at least in part a collection of criteria received from a plurality of users in an on-line community.

9. The system of claim 1, comprising a processor configured to generate a graphical representation of the multi-tiered query to be displayed to a user.

10. The system of claim 9, wherein the processor configured to generate the graphical representation of the multi-tiered query is responsive to receipt of the selections of the criteria and the receipt of the selection of the tier.

11. The system of claim 1, wherein the graphical representation of the filter comprises a horizontal bar with a groove; and a graphical representation of the criterion comprises a peg puzzle piece that matches the groove of the horizontal bar and that is capable of being coupled to the groove.

12. The system of claim 11, wherein the computer processor is configured to receive input relating to a drag and drop operation; and to couple the peg puzzle piece to the groove or remove the peg puzzle piece from the groove based on the drag and drop input.

13. A system comprising one or more computer processors configured for:
    defining a library of available criteria to be used in filtering a population of items to identify a list of items of interest, each criterion having a graphical representation;
    receiving a selection of at least one criterion of the available criteria to be applied to the population as a filter;
    accepting an indication of a tier of the filter to which the selected criterion is to be associated;
    accepting an additional tier to be added to the filter by pre-pending, inserting, or appending the additional tier to the filter;
    identifying a list of items of interest to apply the filter to based on the available criteria; and
    displaying a graphical representation of the filter, including a graphical representation of the selection criterion being associated with the tier of the filter and a graphical representation of the selection criterion being moved from the filter to be applied to the additional tier of the filter.

14. The system of claim 13, comprising a computer processor configured for including the selected criterion into the indicated tier such that a graphical representation of the selected criterion is merged with a graphical representation of the indicated tier in the graphical representation of the filter.

15. The system of claim 13, comprising a computer processor configured for:
    applying a Boolean OR to those criteria on a same tier of the filter; and
    applying a Boolean AND to those criteria residing on different tiers of the filter.

16. The system of claim 13, comprising a computer processor configured for displaying a representation of the list of items of interest.

17. The system of claim 13, comprising a computer processor configured for:
    receiving an indication of one of the tiers of the filter;
    identifying, in response to the receiving, a group of items satisfying the filter at the indicated tier; and
    displaying the group of items.

18. The system of claim 13, wherein available criteria comprise criteria derived from a community of investors.

19. The system of claim 13, wherein available criteria comprises user customizable filter criteria.

20. The system of claim 13, comprising one or more computer processors configured for moving a criterion from a first tier to a second tier responsive to an action of a user with respect to the graphical representation of the filter.

21. The system of claim 13, wherein the current set of criteria comprises at least in part a collection of criteria received from a plurality of users in an on-line community.

22. A system comprising one or more computer processors configured to:
    define a library of available criteria to be used in filtering a population of items to identify items of interest, each criterion having a graphical representation;
    receive selections of criteria to be applied to data as a multi-tiered query;
    receive a selection, for at least one criterion of the criteria, of a tier of the multi-tiered query to which the at least one criterion is to be applied;
    construct the multi-tiered query utilizing the criteria and the received selection of a tier;
    receive an indication of a tier level;
    construct a query using the indicated tier level and all prior tier levels;
    display a graphical representation of the filter while the filter is constructed; and
    move a criterion from a first tier in the multi-tiered query to a second tier in the multi-tiered query responsive to an action of a user with respect to a graphical representation of the multi-tiered query.

23. The system of claim 22, comprising a computer processor configured to receive selections of a plurality of tiers to which the criteria are to be applied.

24. The system of claim 22, wherein the processor configured to receive the selection of the criteria is responsive to a user selection of graphical representations of the criteria.

25. The system of claim 22, wherein the processor configured to receive the selection of the tier of the multi-tiered query is responsive to a placement of a graphical representation of the at least one criterion relative to a graphical representation of the multi-tiered query.

26. The system of claim 25, further comprising a processor configured to remove a criterion from the multi-tiered query responsive to an action of a user with respect to the graphical representation of the multi-tiered query.

27. The system of claim 22, comprising a processor configured to identify a list of items satisfying the multi-tiered query.

28. The system of claim 22, comprising a processor configured to display a graphical representation of the multi-tiered query while the multi-tiered query is constructed.

29. The system of claim 22, wherein the criteria is selected from a collection of criteria received from a plurality of users in an on-line community.

30. The system of claim 22, wherein the processor configured to receive the selection of the tier is configured to receive an input associated with a graphical representation of the received tier.

31. The system of claim 22, comprising:
    a processor configured to apply a Boolean OR to criteria on a common tier of a graphical representation of the multi-tiered query; and
    a processor configured to apply a Boolean AND to different tiers of the graphical representation of the multi-tiered query.

32. The system of claim 22, comprising a processor configured to display data responsive to the criteria and the multi-tiered query.

* * * * *